United States Patent
Fujimaki et al.

(12) 
(10) Patent No.: US 6,191,837 B1
(45) Date of Patent: *Feb. 20, 2001

(54) IPS LCD HAVING AN ORGANIC CONDUCTIVE LAYER OUTSIDE THE SUBTRATE

(75) Inventors: Eriko Fujimaki; Toshiaki Ishiyama, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/933,395

(22) Filed: Sep. 19, 1997

(30) Foreign Application Priority Data

Sep. 20, 1996 (JP) .................................... 8-250644

(51) Int. Cl.⁷ ..................... G02F 1/1333; G02F 1/1393
(52) U.S. Cl. ............................... 349/141; 349/40
(58) Field of Search ................. 349/141, 40, 42, 349/43

(56) References Cited

U.S. PATENT DOCUMENTS

| | | | |
|---|---|---|---|
| 5,760,857 | * | 6/1998 | Yanagawa et al. ........... 349/43 |
| 5,870,160 | * | 2/1999 | Yanagawa et al. ........... 349/141 |

FOREIGN PATENT DOCUMENTS

| | | | |
|---|---|---|---|
| 60-158421 | * | 8/1985 | (JP) . |
| 62-67515 | | 3/1987 | (JP) . |
| 62-78532 | * | 4/1987 | (JP) . |
| 1-283504 | | 11/1989 | (JP) . |
| 4-51220 | | 2/1992 | (JP) . |
| 6-160878 | | 6/1994 | (JP) . |
| 8-171082 | | 7/1996 | (JP) . |
| 8-234160 | * | 9/1996 | (JP) . |

* cited by examiner

Primary Examiner—James A. Dudek
Assistant Examiner—Toan Ton
(74) Attorney, Agent, or Firm—Sughrue, Mion, Zinn, Macpeak & Seas, PLLC (57) ABSTRACT

A liquid crystal display and method of producing the same. The liquid crystal display comprises a first substrate having an outside surface and an inside surface, a second substrate having an outside surface and an inside surface facing the inside surface of the first substrate, and a liquid crystal composition sandwiched between the first and second substrates. The inside surface of the first substrate has disposed thereon at least first and second electrodes to thereby provide an electric field having a direction transverse to the first and second substrates and which controls the polarizing activity of the liquid crystal when a voltage is developed between the first and second electrodes. Furthermore, an electroconductive film is provided on the outside surface of one or both of the first and second substrates. The orientation of the liquid crystal is controlled by a transversely-oriented electric field. The display prevents static electricity generated outside the display from disturbing the electric field to thereby prevent a reduction in contrast and deterioration in display quality, and provides a simple method for forming the electroconductive film which dispenses with the need for a vacuum-operated apparatus.

28 Claims, 5 Drawing Sheets

IPS LCD HAVING AN ORGANIC CONDUCTIVE LAYER OUTSIDE THE SUBTRATE

BACKGROUND OF THE INVENTION

1. Field of the Invention

The present invention relates to a liquid crystal display based on an active matrix and a method for producing the same. More particularly, the present invention relates to a liquid crystal display based on an active matrix wherein orientation of the liquid crystal is regulated by a transversely-activated electric field, and a method for producing the same. Furthermore, the present invention relates to a liquid crystal display wherein the display quality is protected against deterioration due to external static electricity, and a method for producing the same.

2. Description of the Related Art

Generally, a conventional active matrix liquid crystal display comprises a nematic liquid crystal sandwiched between a pair of transparent substrates. A voltage is applied between the transparent substrates to align the crystal in an upright position and thereby control the transmission of light (vertical drive mode).

A liquid crystal display based on the above mechanism includes switching elements, an active matrix substrate having various electrodes disposed thereon, a second substrate facing the foregoing substrate, a liquid crystal inserted between the substrates, and polarizing plates arranged on the outside surfaces of the two substrates. Gate and drain electrodes are formed in the horizontal and vertical directions of the active matrix substrate, and switching elements are formed at the intersections thereof.

A transparent pixel electrode is formed in the area surrounded by the gate and drain electrodes, and that area forms a pixel. Numerous pixels having the above constitution are formed on the transparent substrate. A second transparent substrate carries a common electrode thereon. A voltage applied between the electrodes formed on the two substrates changes the orientation of the liquid crystal, to thereby modulate the transmission of light.

Figure 3A:
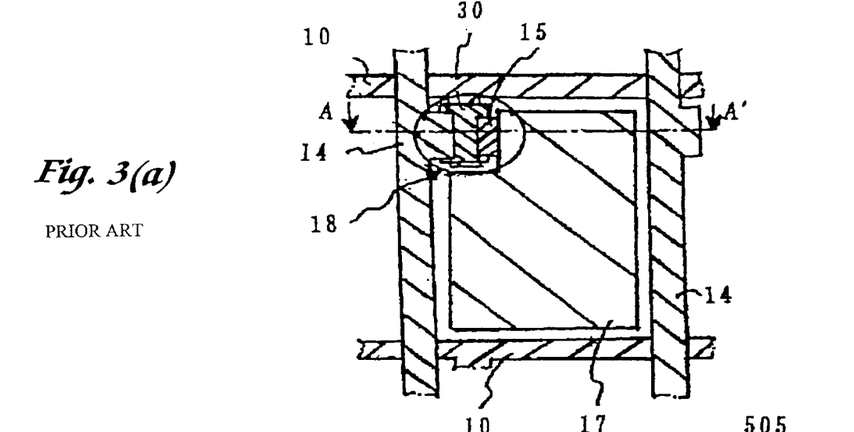
FIG. 3(a) is a plan view of the components of interest.
Figure 3B:
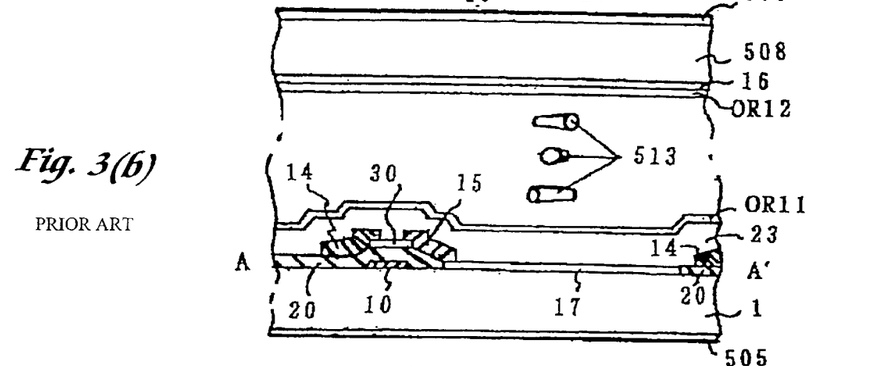
FIG. 3(b) is a sectional view along the line A-A' in FIG. 3(a) when the display is not activated.
Figure 3C:
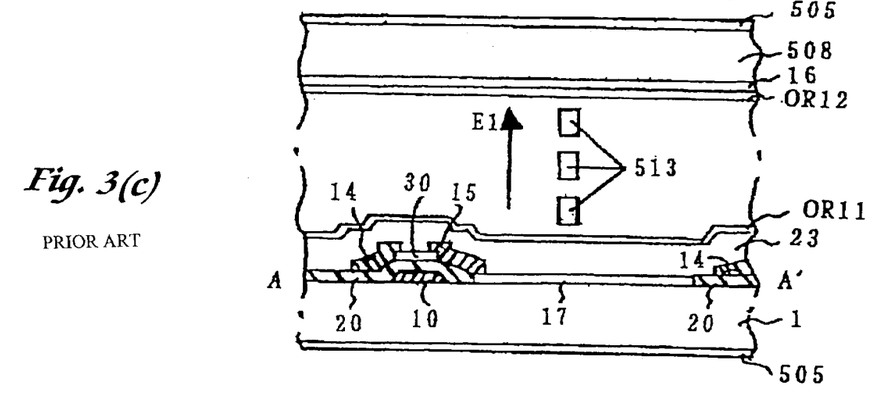
FIG. 3(c) shows the same cross-section when the display is activated.

FIG. 3(a) is a plan view illustrating the construction of a conventional liquid crystal display based on an active matrix. FIG. 3(b) is a sectional view along the line A-A' of FIG. 3(a) when the display is not activated, and FIG. 3(c) shows the same cross-section when the display is activated.

As shown in these figures, the structure of the liquid crystal display is such that drain electrodes 14 and gate electrodes 10 are disposed vertically and horizontally on transparent substrate 1, respectively, and a transparent pixel electrode 17 is formed in each area surrounded by the two electrodes. The pixel electrode 17 is connected through a switching element 18 and a source electrode 15 to a drain electrode 14.

The switching element 18 often consists of a thin-film transistor. The thin-film transistor includes a drain electrode 14 which contacts a source electrode 15 through a semiconductor layer 30, and has a gate insulating membrane 20 beneath the semiconductor layer 30 and a gate electrode 10 beneath the semiconductor layer 30.

Another transparent substrate or paired substrate (also referred to as a "transparent electrode") 508 facing the foregoing substrate 1 has a common electrode 16 formed thereupon. A liquid crystal composition (as shown by liquid crystal molecules 513) is sandwiched between the two transparent substrates 1 and 508. The crystal orientation of the liquid crystal (the liquid crystal molecules 513) is nearly parallel to the transparent substrates 1 and 508, and is twisted under the influence of the alignment layers OR11 and OR12, from substrate 1 towards the other substrate 508, until the shift in orientation angle reaches 90 degrees.

The operation of this system is described below.

When a specific voltage is applied to the gate electrode 10, the thin-film transistor (or the switching element 18) is turned on, and electric charge moves from the drain electrode 14 through the semiconductor layer 30 and source electrode 15 to the pixel electrode 17. As shown in FIG. 3(c), the liquid crystal (the liquid crystal molecules 513) is aligned in an upright position with a specified orientation under the influence of an electric field developed between the pixel electrode 17 and the common electrode 16, which alters the polarizing activity of the subject liquid crystal. Through this operation, the transmission of light through individual pixels is altered, the light tone of these pixels is modulated, and images are reproduced.

It is known, however, that in such a conventional liquid crystal display, the tone intensity in the display varies depending on the angle from which the viewer watches the display. For example, when viewed from the front with the panel placed upright, or along an axis normal to the panel, one can see images having good contrast. However, when viewing the same image along an axis that is slightly tilted downward, the image appears darker. If the tilted angle is further increased, there will be a boundary beyond which a reverse in tone will occur. In contrast, when viewing the same image along an axis slightly tilted upward, the image appears lighter.

The above phenomenon occurs because a vertically oriented electric field (an electric field having a direction vertical to the transparent substrates) is applied to align the liquid crystal molecules in an upright position. This modulates the polarizing activity of the liquid crystal molecules, such that the direction towards which the liquid crystal molecules are aligned is determined in advance.

To solve the problem of tone variation which depends on the angle from which the display is viewed, a number of solutions have been proposed. Such solutions include, for example, the use of optically compensated films, liquid crystals having a multi-domain orientation, and driving with a transversely oriented electric field.

The method using optically compensated films includes two varieties: one incorporates diffraction and the other is based on the dispersion of converged parallel beams. These methods, however, present problems such as reduced brightness when viewed from the front and tone reversal.

Recently a method has been proposed in which a discotic liquid crystal having a disc-like molecular structure is orderly arranged in accordance with the inclination of nematic liquid crystal molecules and converted into a film. The film is then applied to a polarizing plate. This method solves the above problems.

Multi-domain orientation is a method which divides pixels into a plurality of groups having different orientations, to thereby improve the asymmetric optical performance inherent in a twisted nematic liquid crystal.

The two-domain method or one of the varieties of the multi-domain orientation includes dividing each pixel into an upper part and a lower part, and providing orientation regulating films (alignment layers) each rubbed in a direction opposite the other. As a result, the liquid crystal molecules associated with the two respective parts are oriented opposite each other. This arrangement allows each pixel to provide symmetrical optical performance between the upper and lower halves, and light distribution on the pixel is averaged when viewed from the outside. Accordingly, the problem of tone variation as a function of viewing angle is improved.

Driving by a transversely-oriented electric field has a special significance in this invention. As described above, this method includes controlling the polarizing activity of the liquid crystal with an electric field having a direction transverse to the transparent substrates, as opposed to a conventional liquid crystal display system where the orientation of the liquid crystal is controlled by a vertically-oriented electric field. This method provides a wide-view angle and the display undergoes less change in color tone. Thus, this method is considered to be the most promising means of improving viewability, and many developmental efforts have been directed thereto.

As described in Japanese Unexamined Patent Publication No. 6-160878, driving by a transversely-oriented electric field includes applying an electric field in a direction parallel to the transparent substrates, to thereby twist the orientation of the liquid crystal towards the direction of the electric field and modulate the transmission of light.

Figure 4A:
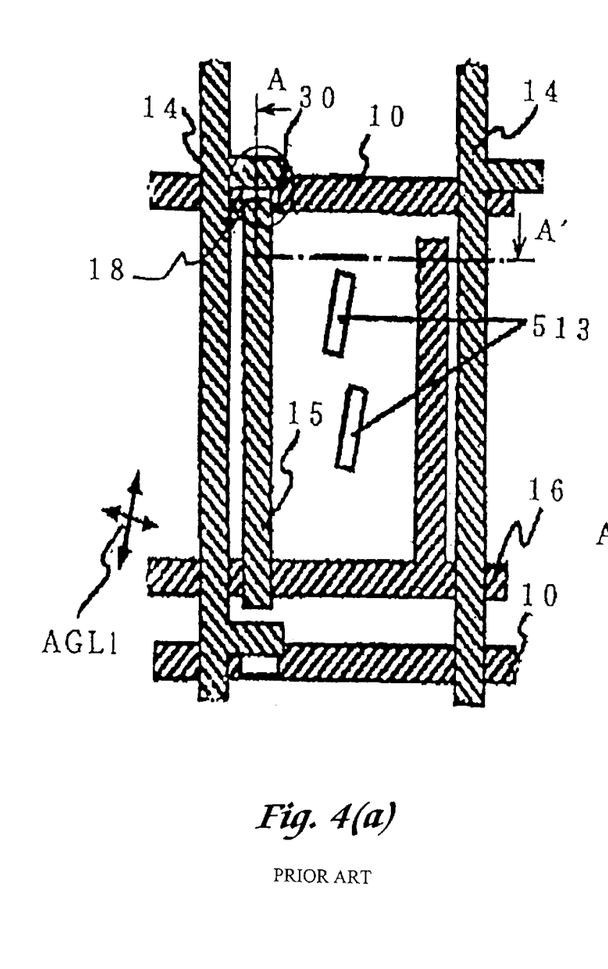
FIG. 4(a) is a plan view of the components of interest when a voltage is applied thereto.
Figure 4B:
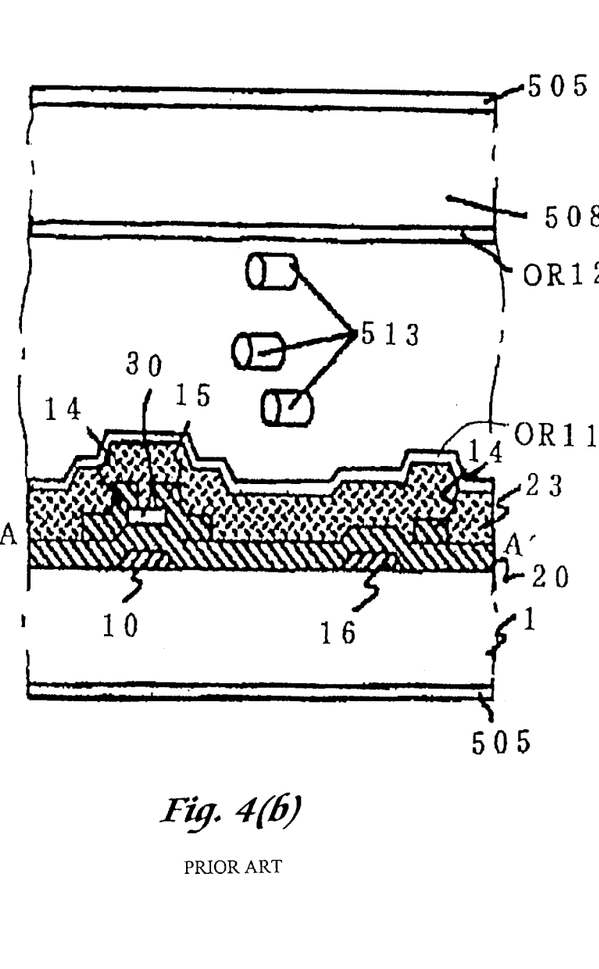
FIG. 4(b) is a sectional view along the line A-A' of FIG. 4(a).
Figure 5A:
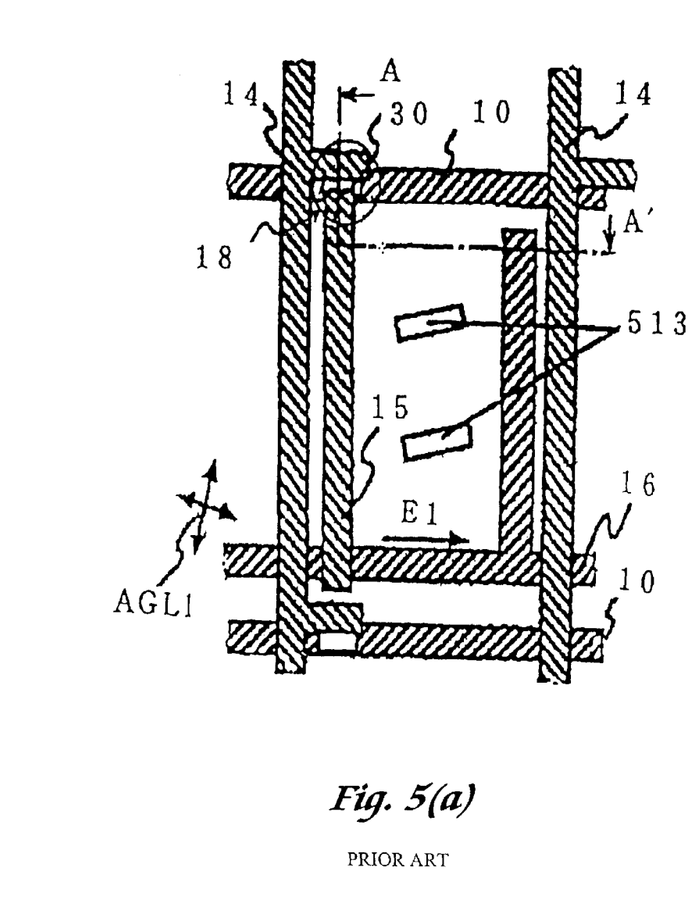
FIG. 5(a) is a plan view of the components of interest when a voltage is applied thereto.
Figure 5B:
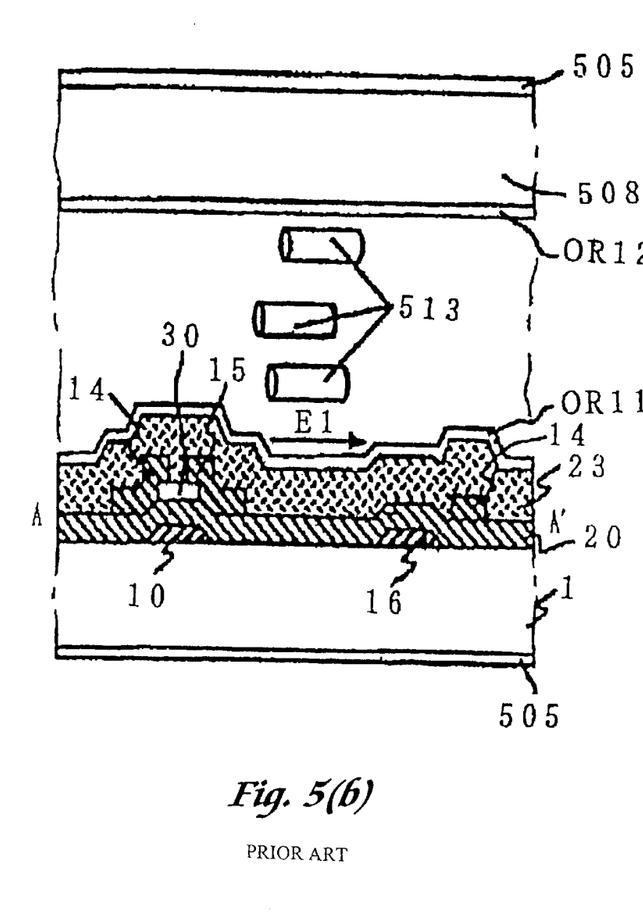
FIG. 5(b) is a sectional view along the line A-A' of FIG. 5(a).

FIGS. 4(a)–4(b) and 5(a)–5(b) are schematic diagrams illustrating the working principle of a liquid crystal display based on this driving mode when viewed in terms of a unit pixel thereof. FIG. 4(a) is a plan view of the pixel when a voltage is not applied, and FIG. 4(b) is a sectional view along the line A-A' of FIG. 4(a). FIG. 5(a) is a plan view of the pixel when a voltage is applied, and FIG. 5(b) is a sectional view along the line A-A' of FIG. 5(a).

This liquid crystal display includes a pair of transparent substrates 1 and 508 and liquid crystal in the gap space therebetween, and polarizing plates 505 disposed outside the substrates. On the transparent substrate 1, drain electrodes 14 and gate electrodes 10 are arranged lengthwise and crosswise, respectively. The drain electrode 14 is connected through a switching element 18 to a source electrode 15.

Common electrodes 16 and source electrodes 15 face each other like two combs having teeth directed towards one another. When an electric field is developed between the two electrodes, the orientation of the liquid crystal is altered. A liquid crystal composition (liquid crystal molecules 513) is introduced between the transparent substrate 1 and opposing substrate 508, and is nearly parallel to the transparent substrates 1 and 508 with intervening alignment layers OR11 and OR12 arranged therebetween. The polarizing plate 505 is constructed such that the upper and lower halves have transmission axes intersecting each other at a right angle. This is called a cross-nicol arrangement.

The working principle of this system is described below.

As shown in FIGS. 4(a) and 4(b), when an electric field is not applied, the liquid crystal 513 is oriented with an angle slightly tilted towards the longitudinal axis of the source electrode 15 and common electrode 16 arranged like the teeth of two opposing combs. When a voltage is applied to the gate electrode 10 to turn on the switching element 18, this voltage is applied to the source electrode 15 which generates an electric field E1 between the source electrode 15 and common electrode 16. Then, as shown in FIGS. 5(a) and 5(b), the liquid crystal changes its orientation to align its axis towards the direction of the electric field.

Consider the situation where the liquid crystal (the liquid crystal molecules 513) is anisotropic and has a positive dielectric constant. When the two polarizing plates 505 disposed outside the upper and lower transparent substrates 1 and 508 are arranged so that their light transmission axes have a specified angle AGL1 relative to each other, a voltage applied between the source electrode 15 and the common electrode 16 can alter the transmission of light through the liquid crystal. In more detail, when a voltage is not applied thereto, the birefringence of the liquid crystal is 0 and the intensity of transmitted light is 0. On the other hand, when a voltage is applied thereto, the liquid crystal molecules rotate in the same plane as the direction of the electric field developed between the source electrode 15 and common electrode 16 to exhibit a birefringence property. Then, the intensity of transmitted light is greater than 0. These two states represent gray scales from black to white. Accordingly, in contrast with a system based on vertical application of an electric field, liquid crystal molecules in this system do not assume an upright position when excited. Hence, light distribution on the display does not vary much even when viewed from different angles. This greatly reduces tone variation as function of viewing angle.

However, when a transversely-oriented electric field as described above is used to alter the orientation of the liquid crystal, static charge (static electricity) present on the panel surface (surface of the opposing substrate) generates a vertically-oriented electric field between the static charge and the electrodes. As a result, the liquid crystal tends to assume an upright position, and this interferes with normal viewability of the display.

A conventional system based on a vertically-oriented electric field has paired electrodes formed on transparent substrates and hence is relatively free from disturbance due to static electricity. On the other hand, a system based on a transversely-oriented electric field has working electrodes formed on the active matrix substrate and not on the opposing paired substrate. Accordingly, if static electricity is generated outside the transparent substrates, that is, if static charge accumulates on the surface of the polarizing plates, the static charge tends to disturb the electric field that is concurrently applied to the liquid crystal layer. This, in turn, may result in an uneven display tone.

Furthermore, a liquid crystal display based on a transversely-oriented electric field employs a horizontally placed nematic liquid crystal, and hence is more sensitive to the erratic occurrence of vertically-oriented static electricity than a system based on a vertically-oriented field. Thus, the liquid crystal in a system based on a transversely-oriented electric field readily responds to such vertically-oriented static electricity. This, in turn tends to disturb the display characteristics in terms of uneven tone and reduced contrast.

To suppress the undesirable effects of static charge on a liquid crystal display panel, a method has been proposed in which transparent electroconductive films are disposed outside the transparent substrates sandwiching a liquid crystal. For example, Japanese Unexamined Patent Publication No. 4-51220 discloses a method for producing a liquid crystal display based on a vertically-oriented field in which electroconductive films are applied to the surfaces of transparent substrates opposite those facing the liquid crystal. The electroconductive film can comprise indium tin oxides (ITO) or an ITO coated polyethylenesulfite film.

Furthermore, a method in which an electroconductive film is coated on a polarizing plate is disclosed in Japanese Unexamined Patent Publication No. 1-283504. This method includes applying a hard coat film to the surface of a polarizing plate, and depositing an electroconductive film by metallization on the hard coat film, to thereby produce a polarizing plate having an electroconductive film coated thereon. In this method, low-temperature metallization employing a vacuum metallization apparatus allows for continuous metallization of an ITO compound to produce an ITO-coated polarizing plate.

When an ITO compound or tin oxide (NESA) is used as a material of the electroconductive film, as described in Japanese Unexamined Patent Publication Nos. 4-51220 and 1-283504, sputtering or vacuum deposition is needed to form the electroconductive film. If such a vacuum-operated apparatus is introduced, restrictions must be imposed on the process to prevent damage during film formation, or a process for preparing a hard coat film is added to provide a base so that the overlying metal oxide film has a flat surface.

Furthermore, the above method requires time for cleaning the vacuum chamber which increases the production cost. This is particularly true for the method disclosed in the above Japanese Unexamined Patent Publication No. 1-283504. In this method, the polarizing plate is composed of fibrous transparent unit substrates made of triacetylcellulose which are glued together. Leakage of an agent such as a plasticizer therefrom interferes with the formation of a flat film. This makes it necessary to apply a hard coat film as a base, thus complicating the process.

As described above, if an ITO or NESA compound is applied through metallization by means of a vacuum deposition apparatus to produce an electroconductive film, there is a need to prevent damage cased by this process. As a result, the process becomes complicated and an increase in operating cost is unavoidable.

An alternative method is disclosed in Japanese Unexamined Patent Publication No. 62-67515 in which an electroconductive film formed on a polarizing plate is treated with a cation surfactant. This disclosure, however, lacks concrete descriptions and practicability. Furthermore, because the surface of the electroconductive film which has been treated with a cation surfactant is exposed and unprotected, the subject film is unlikely to be active for a sufficiently long time.

As described above, to prevent the disturbance of a liquid crystal cell due to static electricity, a structure has been adopted wherein transparent electroconductive films are formed outside the transparent substrates which sandwich the polarizing plates and liquid crystal. This method, which allows for production of a transparent electroconductive film having a long-lasting effect and chemical stability, utilizes metallization by sputtering or vacuum deposition of a metal oxide, particularly indium tin oxides (ITO) and tin oxides (NESA).

However, in order to prevent damage during film formation, restrictions must be imposed on the process, or a process for a hard coat must be added which serves as a base for the overlying metal oxide film. Thus, the above methods require additional steps which complicate the process.

SUMMARY OF THE INVENTION

It is therefore an object of the present invention to solve the above problems of the prior art and to provide a liquid crystal display and a method of manufacturing the same which controls the orientation of the liquid crystal with a transversely-oriented electric field, and which prevents static electricity generated outside the display from exerting undesirable effects on the electric field, and which provides a simple process and dispenses with the need for a vacuum-operated apparatus.

The above objectives of the present invention are achieved by providing a liquid crystal display comprising a first substrate having an outside surface and an inside surface, a second substrate having an outside surface and an inside surface facing the inside surface of the first substrate, and a liquid crystal composition sandwiched between the first and second substrates, the inside surface of the first substrate having disposed thereon at least first and second electrodes to thereby provide an electric field having a direction transverse to the first and second substrates and which controls the polarizing activity of the liquid crystal when a voltage is developed between said first and second electrodes, and an electroconductive film provided on the outside surface of one or both of the first and second substrates.

In a preferred embodiment, the liquid crystal display further comprises a polaraizing plate provided on the outside surface of one or both of the first and second substrates.

In yet another preferred embodiment, the electroconductive film comprises an organic electroconductive film.

In yet another preferred embodiment, one or both of the first and second substrates is transparent.

In yet another preferred embodiment, the first substrate is an active matrix substrate.

In yet another preferred embodiment, the electroconductive film is formed on the outside surface of the second substrate and a polarizing plate is provided on the electroconductive film.

In yet another preferred embodiment, a polarizing plate is provided on the outside surface of the second substrate and the electroconductive film is formed on the polarizing plate.

In yet another preferred embodiment, a polarizing plate is provided on the outside surface of the first substrate and the electroconductive film is formed on the polarizing plate.

In yet another preferred embodiment, an electroconductive film is provided on the outside surfaces of each of the first and second substrates.

In yet another preferred embodiment, the liquid crystal display further comprises an alignment layer disposed on the inside surfaces of each of the first and second substrates.

In yet another preferred embodiment, the electroconductive film comprises a polythiophene compound having repeating units represented by the following formula (1), a triacetyl-(2-hydroxyethyl)ammonium salt, or poly (alkylammonium tetraalcoxybolan).

(1)

In yet another preferred embodiment, the inside surface of the first substrate has disposed thereon intersecting gate and drain electrodes, switching elements at the intersections between the gate and drain electrodes, a source electrode connected to the switching element and a common electrode at least part of which faces the source electrode, to thereby provide an electric field having a direction transverse to the first and second substrates when a voltage is developed between the source electrode and the common electrode.

The above objectives of the present invention are also achieved by providing a method for producing a liquid crystal display which comprises (1) providing a first substrate having an outside surface and an inside surface, a second substrate having an outside surface and an inside surface facing the inside surface of the first substrate, and a liquid crystal composition sandwiched between the first and second substrates, the inside surface of the first substrate having disposed thereon at least first and second electrodes to thereby provide an electric field having a direction transverse to the first and second substrates and which controls the polarizing activity of the liquid crystal when a voltage is developed between said first and second electrodes, and (2) providing an electroconductive film on the outside surface of one or both of the first and second substrates.

The orientation of the liquid crystal in the display of the present invention is controlled by a transversely-oriented electric field. The liquid crystal display having the above described structure in which an electroconductive film is formed on one or both of the first and second substrates or on a polarizing plate prevents the accumulation of static electricity on the panel surface. As a result, this arrangement prevents erratic operation of the liquid crystal due to static electricity, and ensures a high-contrast and high-quality display. In addition, the present invention provides a simple and inexpensive method for forming the electroconductive film which dispenses with the need for a vacuum-operated apparatus.

As used herein, the expression "provided on the outside surface of the substrate" means that the subject electroconductive film or polarizing plate is provided on the substrate either directly or via one or more intermediate layers, films or plates.

BRIEF DESCRIPTION OF THE DRAWINGS

FIGS. 1(a) and 1(b) illustrate the structure of the liquid crystal display of Example 1 of this invention.

FIGS. 3(a)–3(c) illustrate the structure of a conventional liquid crystal display.

FIGS. 4(a) and 4(b) illustrate the structure of a conventional liquid crystal display based on a transversely-oriented electric field.

FIGS. 5(a) and 5(b) illustrate the structure of a conventional liquid crystal display based on a transversely-oriented electric field.

DETAILED DESCRIPTION OF THE PREFERRED EMBODIMENTS

The present invention is described below in greater detail by reference to the following Examples and accompanied drawings, however, the present invention should not be construed as being limited thereto.

EXAMPLE 1

Figure 1A:
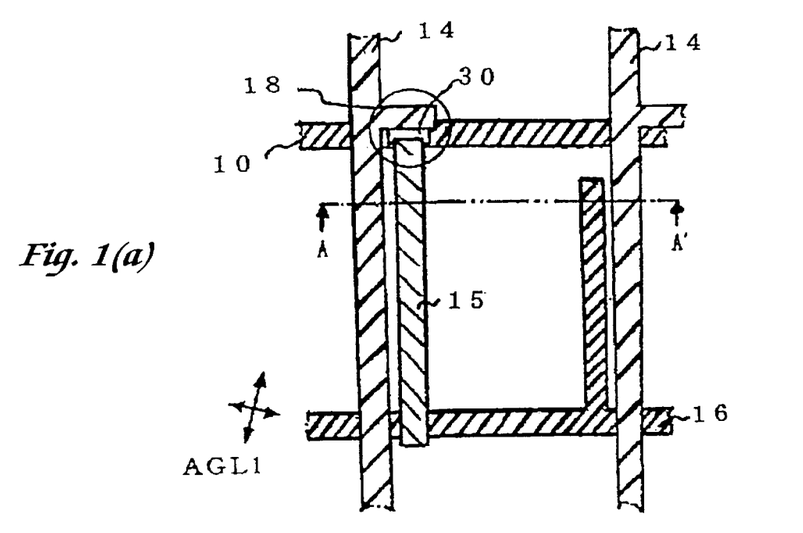
FIG. 1(a) is a plan view of the components of interest.
Figure 1B:
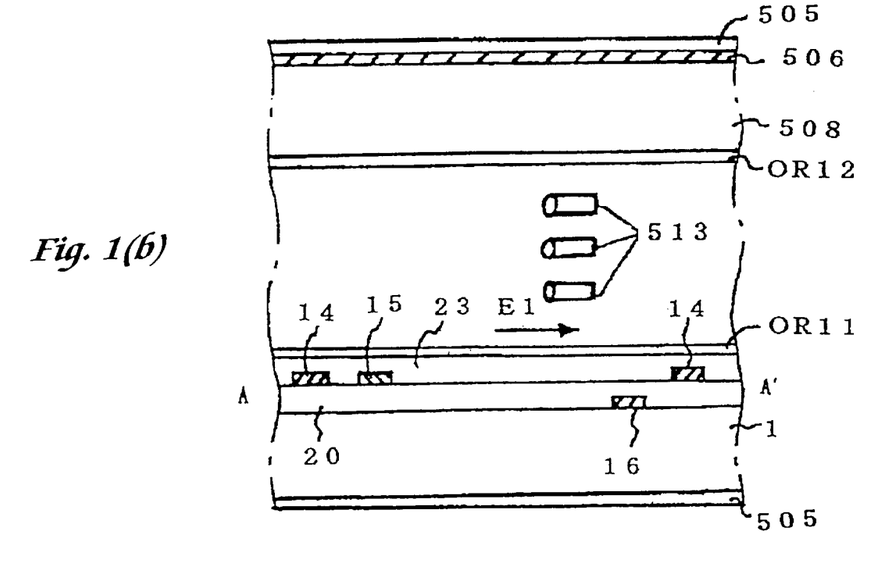
FIG. 1(b) is a sectional view along the line A-A'.

FIGS. 1(a) and 1(b) illustrate plan and sectional views of a first example of the liquid crystal display of the present invention.

This liquid crystal display comprises a pair of opposing transparent substrates 1 and 508, a liquid crystal composition comprising liquid crystal molecules 513 in the gap space between the opposing transparent substrates 1 and 508, an organic electroconductive film 506 formed on an outside surface of one of the transparent substrates (paired substrate), and polarizing plates 505 disposed on the outside surface of each of transparent substrates 1 and 508.

Drain and gate electrodes 14 and 10 are formed on the inner surface of substrate 1 in a lengthwise and crosswise direction, respectively, and the drain electrode 14 is connected through a switching element 18 to a source electrode 15. The common electrodes 15 and the source electrodes 16 interdigit each other like the teeth of two opposing combs. An electric field developed between the source and common electrodes modulates the orientation of the liquid crystal composition (liquid crystal molecules 513). A protective insulating film 23 is formed to cover these electrodes, and orientation regulating film OR11 is formed on the insulating film 23. Also, an alignment layer (orientation regulation film) OR12 is formed on the inner surface of the transparent substrate 508.

An anisotropic liquid crystal composition comprising liquid crystal molecules 513 having a positive dielectric constant is inserted in the gap between the transparent substrate 1 and the paired substrate 508. The liquid crystal is oriented nearly parallel to the paired transparent substrates 1 and 513 with the alignment layers OR11 and OR12 intervening therebetween. An organic electroconductive film 506 is formed on the outside surface of the opposing substrate 508 (i.e., the surface opposite the surface that contacts the liquid crystal composition). A lower polarizing plate 505 is disposed on the electroconductive film 506, and an upper polarizing plate 505 is disposed on the outside surface of the transparent substrate 1.

The upper and lower polarizing plates 505 have transmission axes intersecting each other at a right angle. This is called a cross-nicol arrangement. The transmission axis of the lower polarizing plate 505 is arranged to conform with the orientation of the liquid crystal 513, or is tilted at an angle AGL1. The transmission axis of the upper polarizing plate 505 is arranged so as to be normal to the transmission axis of the lower polarizing plate 505.

The structure of the switching element 18 is the same as that of the thin-film transistor described above with respect to the related art. In the switching element shown in FIG. 4(b), the drain electrode 14 contacts the source electrode 15 through a semiconductor layer 30. That is, the drain electrode 14 and source electrode 15 contact opposing ends of the semiconductor layer 30. A gate insulating layer 20 is arranged below the semiconductor layer 30, which, in turn, overlies the gate electrode 10.

The operation of this system is described below.

When an electric field is not applied, liquid crystal molecules 513 are oriented at an angle which is slightly tilted with respect to the longitudinal axis of the source and common electrodes 15 and 16 arranged like the teeth of two opposing combs. Namely, the liquid crystal molecules 513 are arranged so as to have a longitudinal (optical) axis that is tilted not less than 45 degrees but less than 90 degrees relative to the direction of the electric field (normal to the longitudinal axis of the source and common electrodes 15 and 16).

In this state, the liquid crystal molecules do not exhibit a birefringent activity such that the intensity of transmitted light is 0. When a voltage is applied to the gate electrode 10, to turn on the switching element 18, this voltage is also assumed by the source electrode 15. This generates an electric field E1 between the source electrode 15 and common electrode 16. Consequently, the liquid crystal molecules change their orientation towards the direction of the electric field. When the two polarizing plates 505 disposed outside the upper and lower transparent substrates 1 and 508 are arranged such that their light transmission axes have a specified angle AGL1 relative to each other, the applied voltage alters the transmission of light through the liquid crystal.

Static electricity that is generated on the surface of the liquid crystal display, for example, by touch of hand or other similar sources, imparts a longitudinally-oriented electric field between the active electrodes. This tends to align the liquid crystal in an upright position, to thereby cause light leakage due to birefringence. If the transparent substrate or the polarizing plate does not have an electroconductive film thereupon, and thus is insulated from its surroundings, the static electricity cannot dissipate and remains accumulated on the surface of the display for a long period of time. Accordingly, those parts of the display panel which accumulate static electricity by chance due to touch will allow light to leak and appear whitish. This state will last a fairly long time, and will greatly reduce the quality of the display.

By contrast, if an electroconductive film 506 is formed on the surface of a substrate 508, or on the polarizing plate 505, static electricity, even when generated by chance, will dissipate through the electroconductive film 506, or will be discharged, and hence will not disturb the performance of the liquid crystal display panel. For this reason, the present invention prevents static electricity developed outside the display from disturbing the electric field applied to the liquid crystal, to thereby ensure a high quality display.

Generally, the electroconductive film is electrically connected at one or more places to the frame or housing of the display, and the frame is grounded to effectively dissipate static charge.

The liquid crystal display of the present invention was produced according to the method described below.

First, a chromium film was formed by sputtering on a transparent substrate 1, and the gate and common electrodes 10 and 16 were pattern-etched by photolithography. Next, a gate insulating membrane 20 made of silicone nitride and an amorphous silicone membrane (a-Si) 30 were formed thereon by a CVD method. Drain and source electrodes made of chromium were prepared by sputtering and photolithography to cover part of the a-Si membrane. Together, these components constitute a thin-film transistor. Then, an insulating protective layer 23 made of silicone nitride was formed thereon.

A polyimide alignment layer OR11 was formed over these electrodes in such manner as to orient the liquid crystal (introduced in a later step) at an angle of 15 degrees relative to the source electrode 15. An 50 ml ethanol solution containing 1 g of 3,4-ethylenedioxythiophene and 5 g of p-toluenesulfonic acid Fe(III) salt was coated on the surface of the opposing substrate 508 opposite the surface that is to contact the liquid crystal layer. The assembly was heated and dried in an oven, to form an organic electroconductive film 506 having a thickness of 200 Å.

A polyimide alignment layer OR12 was provided on the other surface of the substrate 508 opposite the side having thereon the organic electroconductive film 506 and subjected to orientation treatment. Then, the two substrates were positioned parallel to one another, and spacers having an external diameter of 5.5 $\mu$m were inserted between the two substrates to produce a liquid crystal cell. A nematic liquid crystal composition having a dielectric anisotropy of 4.5 and a birefringence $\Delta$=0.067 was injected into the resulting gap, and polarizing plates 505 were overlaid on the outer surface of substrate 1 and the electroconductive film 506 to complete a liquid crystal display having a background that is normally black. The surface resistance of the electroconductive film 506 prepared on this liquid crystal display system measured 100 k$\Omega$/sq. which was sufficiently low to dissipate static electricity.

When this liquid crystal display was turned on, and static electricity from outside the display was developed on the surface of the polarizing plate 505, the electricity dissipated through the electroconductive film 506 such that an increase in brightness of the normally black display did not occur. The display provided a sufficiently high contrast of 1:120.

On the other hand, when a conventional liquid crystal display not equipped with an electroconductive film was turned on, black images on the display appeared whitish and the contrast deceased to a valve as low as 1:25. Moreover, when the panel was touched by fingers, the touched spots appeared whitish, even though an electric field was not generated by a driving circuit. This is probably because the finger touch generated static electricity on the surface of the polarizing plate which created a longitudinally-oriented electric field. This, in turn, aligned the liquid crystal in an upright position, such that the touched spots appeared whitish.

The electrode structure for use in the present invention is not particularly limited as long as it allows for the application of a transversely-oriented electric field on the liquid crystal composition. The configuration of the electrodes is not limited to that described in the above embodiment. The common and source electrodes are preferably constructed so as to provide a free aperture that is as large as possible, and may have an annular, cross, $\pi$-shape, I-shape, ladder, etc. form. If electrodes having the above forms are appropriately combined, they will provide a larger free aperture than possible by interdigitating the respective electrodes like the teeth of two opposing combs.

In the present embodiment, the organic electroconductive film 506 was formed on the outside surface of the paired substrate 508, but the electroconductive film 506 may also be formed on both transparent substrates (glass substrates) to provide more stable static electricity elimination.

The electroconductive film 506 of the present invention may be produced after 3,4-ethylenedioxythiophene has been polymerized in a solvent which is inert under the polymerization reaction conditions, by the use of a polymerizing agent such as an oxidant suitable for acidic polymerization, or by certain electrochemical means.

Polymerization by chemically activated oxidation takes place as follows: 3,4-ethylenedioxyphene and the oxidant are placed together in a solvent which is inert under the polymerization reaction conditions. The resulting solution is coated on the substrate, and allowed to dry at room temperature, or dried by heating. This simple procedure will provide polyethylenedioxythiophene. Alternatively, the above solution comprising 3,4-dioxythiophene and a solution comprising the oxidant can be separately applied to the substrate to form a coating thereon.

The solvent can include any common solvent, as long as it is inert under the polymerization reaction conditions, and may be, for example, an aliphatic alcohol such as methanol, ethanol, propanol, etc., an aromatic hydrocarbon such as benzene, toluene, etc., an aliphatic ketone such as acetone, methylethylketone, etc., water, and combinations of water and an organic solvent.

The oxidant includes those usually used for polymerization of thiophenes such as Fe(III) salts, organic acids, inorganic acid (including organic groups) Fe(III) salts, alkali metal persulfuric acid salts and ammonium persulfate. Particularly preferred are persulfuric acid salts, organic acids, and Fe(III) salts of inorganic acids containing organic groups because they allow the oxidation reaction to proceed slowly.

The solution containing an organic electroconductive substance may be applied by any of spin coating, dip coating, bar coating, spraying and printing. The organic electroconductive film may be coated by printing in the form of a mesh or into a checkerboard pattern. After the solution has been applied, the solvent may be evaporated at room temperature, but drying by heating is preferred because it accelerates processing. Heating to a temperature as high as 80° C. for removing the solvent is more preferred than drying at room temperature because the resulting product will have a higher dielectric constant.

The organic electroconductive film generally has a thickness of from 100 Å to 1 $\mu$m, and more preferably, from 100 Å to 1,000 Å. If the film is too thick, there is an undesirable diffraction effect. If the film is too thin, its conductivity may be too low to effectively dissipate static charge.

Addition of an organic binder to the solution will improve adhesion of the solution to the polarizing plate or to the transparent substrate, to thereby increase the mechanical strength of the electroconductive coating. The organic binder may include, for example, polyvinyl acetate, polymethacrylate, polycarbonate, polyester and silicone resins. Other additives including a plasticizer may be added as appropriate.

EXAMPLE 2

In this Example, an electroconductive film 506 was formed after providing the alignment layer OR11. The other procedures were the same as in Example 1. When the resulting liquid crystal display was turned on, no increase in brightness of the normally black display nor a reduction in contrast as a result of static electricity was observed, and the same effects as in Example 1 were obtained.

EXAMPLE 3

In this Example, in the same manner as in Example 1, a thin-film transistor and electrodes were formed. Also, alignment layers were formed on the electrodes such that the liquid crystal was oriented at an angle of 25 degrees relative to the electrodes.

More specifically, an alignment layer was formed on an opposing substrate which was then subjected to orientation treatment. The two substrates were placed in parallel so that the liquid crystal could assume a parallel orientation thereto, and spacers with an external diameter of 5.5 $\mu$m were inserted into the gap space to produce a liquid crystal cell. A nematic liquid crystal composition was injected into the gap space having a dielectric anisotropy of 4.5 and a birefringence of $\Delta n=0.072$. A 50 ml ethanol solution comprising 0.5 g of poly(alkylammoniumtetraalcoxypolan) and 0.5 g of a triacetyl-(2-hydroxyethyl)ammonium salt was applied to both surfaces of this liquid crystal cell, and the assembly was dried by heating. Then, polarizing plates were overlaid thereon to complete a liquid crystal display having a normally black background.

When the resulting liquid crystal display was turned on, no increase in brightness of the normally black display nor a reduction in contrast as a result of static electricity was observed, even though static electricity was generated on the outside surface of the polarizing plate. The surface resistance of the electroconductive film measured 100 k$\Omega$/sq. which was sufficient to dissipate static electricity.

EXAMPLE 4

In this Example, the same procedure as in Example 1 was followed, except that the electroconductive film was prepared as follows.

A solution comprising 3,4-dioxythiophene in propanol was applied on the transparent substrate (glass substrate) 1, and a solution of a paratoluene sulfonic acid Fe(III) salt in isopropanol was then added thereto. The substrate was dried by heating, washed with running water and dried.

When the resulting liquid crystal display was turned on, no increase in brightness of the normally black display nor a reduction in contrast as a result of static electricity was observed, even though static electricity was generated on the outside surface of the polarizing plate.

EXAMPLE 5

In this Example, the same procedure as in Example 1 was followed, except that the electroconductive film was prepared as follows.

A 50 ml solution of 1 g of 3,4-ethylenedioxythiophene and 2 g of a p-toluenesulfonic acid Fe(III) salt in a mixture of isopropanol/acetone (1:1) was applied on the transparent substrate (glass substrate) 1. The substrate was then dried by heating, washed with running water and dried.

When the resulting liquid crystal display was turned on, no increase in brightness of the normally black display nor a reduction in contrast as a result of static electricity was observed, even though static electricity was generated on the outside surface of the polarizing plate.

EXAMPLE 6

Figure 2:
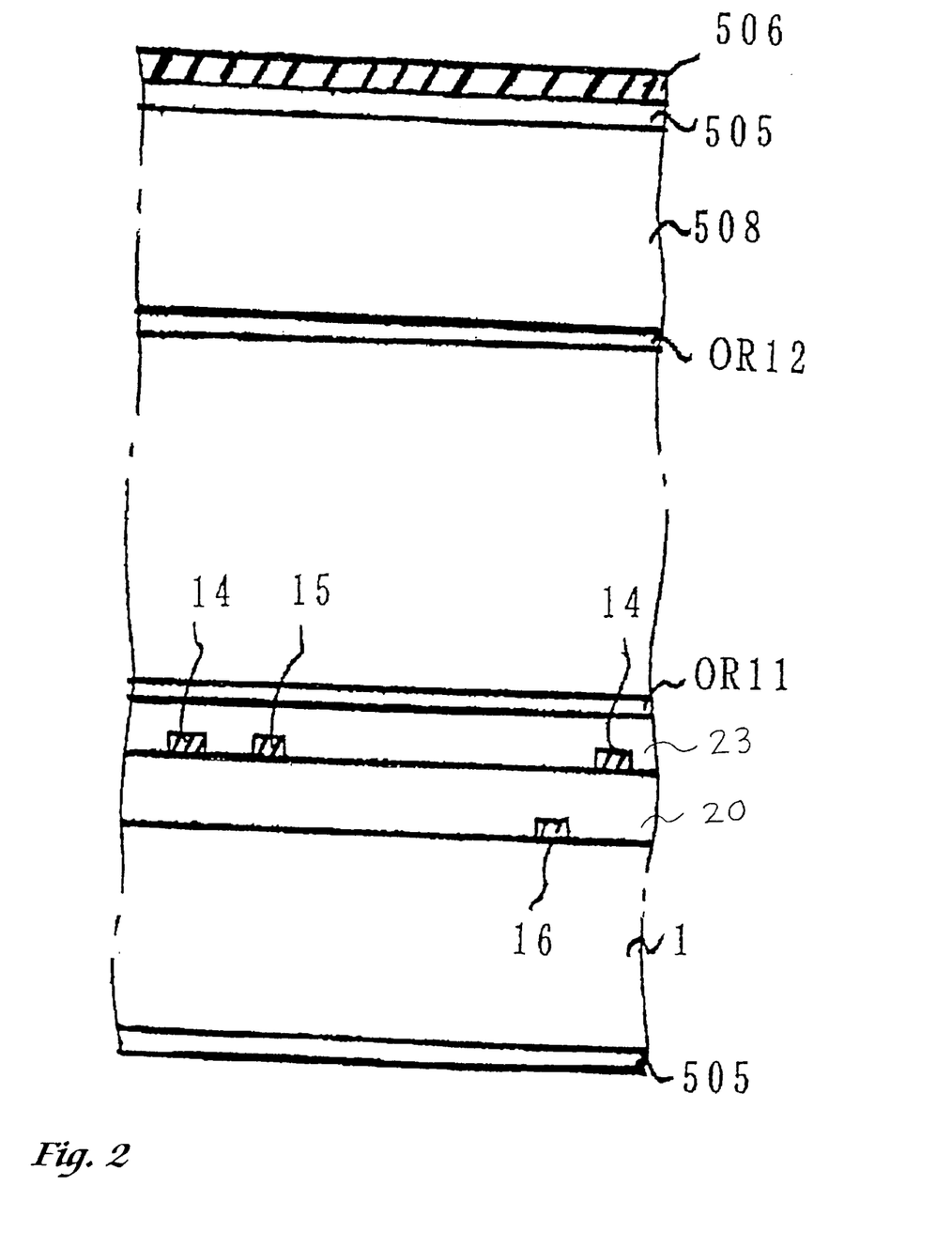
FIG. 2 illustrates the structure of the liquid crystal display of Example 6 of this invention, and is a sectional view similar to that of FIG. 1(b).

FIG. 2 is a cross-sectional view of the liquid crystal display of Example 6 of this invention. This display had the same structure as in the above Examples, except that an organic electroconductive film 506 was formed on the polarizing plate 505.

The method for preparing this liquid crystal display is described below.

A chromium film was formed by sputtering on the transparent substrate 1, and the gate and common electrodes 10 and 16 were pattern-etched by photolithography. The gate insulating membrane 20 made of silicone nitride and an amorphous silicone a-Si membrane 30 were formed thereon using a CVD method.

The drain electrode 14 made of chromium, and the source electrode 15 were prepared by sputtering and photolithography so as to cover part of the a-Si membrane, to thereby obtain a thin-film transistor comprising these components. An insulating protective layer 23 was formed thereon. An alignment layer OR11 was provided over those electrodes to orient the liquid crystal at an angle of 15 degrees relative to the source electrode 15.

An alignment layer OR12 was provided on the substrate 508 and subjected to orientation treatment. Then, the two substrates 1 and 508 were positioned in parallel, and spacers having an external diameter of 5.5 $\mu$m were inserted between the two substrates to produce a liquid crystal cell. A nematic liquid crystal composition was injected into the resulting gap space having a dielectric anisotropy of 4.5 and a birefringence Δn=0.072, and the polarizing plates 505 were overlaid to complete a liquid crystal display having a normally black background.

On the other hand, a 50 ml solution of 1 g of 3,4-dioxythiophene and 5 g of p-toluenesulfonic acid Fe(III) salt in isopropanol was applied to a polarizing plate comprising laminated triacetate substrates having a polarizing element in the core thereof. The resulting plate was dried at room temperature. The plate was then washed with running water and dried to obtain an electroconductive film 506 having a thickness of 100 Å. The plate was glued onto the above liquid crystal cell with an adhesive, to produce a liquid crystal display having a normally black background.

When this liquid crystal display was turned on, and static electricity was generated on the outside surface of the polarizing plate 505, the static electricity dissipated through the electroconductive film 506 which had been formed on the polarizing plate 505 such that an increase in brightness of the normally black display did not occur. This display provided a sufficiently high contrast of 1:130.

The polarizing plate 505 can be subjected to further treatment such as application of an inorganic coat to suppress reflections from the surface of the liquid crystal display and thereby improve visibility, or application of a hard coat to improve mechanical strength and durability, or subjected to an antiglare treatment to reduce reflections from the surface. An electroconductive film may be applied to a polarizing plate which has been subjected to treatment as described above.

EXAMPLE 7

In this Example, the same procedure as in Example 1 was followed except that the electroconductive film was prepared as follows.

A 40 ml solution comprising 1 g of 3,4-dioxythiophene in propanol followed by a 40 ml solution of 5 g of paratoluene sulfonic acid Fe(III) salt in isopropanol were applied on a polarizing plate comprising laminated triacetate substrates having a polarizing element in the core thereof. The substrate was dried by heating, washed with running water and dried.

When the resulting liquid crystal display was turned on, no increase in black brightness nor a reduction in contrast due to static electricity was observed, and the same effects as in Example 6 were obtained.

EXAMPLE 8

In this Example, the same procedure as in Example 6 was followed except that the electroconductive film was prepared as follows.

A 50 ml solution of 1 g of 3,4-dioxythiophene, 2 g of p-toluenesulfonic acid Fe(III) salt, and 5 g of polyvinyl acetate in a mixture of isopropanol/acetone (1:1) was applied on a polarizing plate comprising laminated triacetate substrates having a polarizing element in the core thereof. The resulting plate was dried by heating, washed with running water and dried.

When the resulting liquid crystal display was turned on, no increase in black brightness nor a reduction in contrast due to static electricity was observed, and the same effects as in Example 6 were obtained.

EXAMPLE 9

In this Example, the same procedure as in Example 6 was followed except that the electroconductive film was prepared as follows.

A 50 ml solution of 0.5 g of poly(alkylammoniumtetra-alcoxypolan) and 0.3 g of a triacetyl-(2-hydroxyethyl) ammonium salt in ethanol was applied on a polarizing plate comprising laminated triacetate substrates having a polarizing element in the core thereof. The resulting plate was dried by heating. The plate was glued on the above liquid crystal cell with an adhesive, to produce a liquid crystal display having a normally black background.

When the resulting liquid crystal display was turned on, no increase in black brightness nor a reduction in contrast due to static electricity was observed, and the same effects as in Example 6 were obtained.

As described above, the present invention provides a liquid crystal display based on controlling the orientation of liquid crystal by a transversely-oriented electric field. The inventive display is free from disturbance due to static electricity generated outside the panel, and can prevent a reduction in contrast and deterioration in display quality.

The present invention further obviates the need for a sputtering or metallization step requiring a vacuum-operated apparatus used for preparing ITO or NESA films, and allows for the preparation of electroconductive films by simply applying an electroconductive coating solution and removing the solvent therefrom.

The present invention further prevents static electricity from damaging circuit elements during the application of polarizing plates and removal of protective films, and hence provides a liquid crystal panel having excellent workability.

It should further be apparent to those skilled in the art that various changes in form and detail of the invention as shown and described above may be made. It is intended that such changes be included within the spirit and scope of the claims appended hereto.

What is claimed is:

1. A liquid crystal display comprising:
    a first substrate having an outside surface and an inside surface, a second substrate having an outside surface and an inside surface facing the inside surface of the first substrate, and a liquid crystal composition sandwiched between the first and second substrates,
    the inside surface of the first substrate having disposed thereon at least first and second electrodes to thereby provide an electric field having a direction transverse to the first and second substrates and which controls the polarizing activity of the liquid crystal when a voltage is developed between said first and second electrodes, and
    an electroconductive film which is constituted by organic materials provided on the outside surface of one or both of the first and second substrates.

2. The liquid crystal display as claimed in claim 1, further comprising a polaraizing plate provided on the outside surface of one or both of said first and second substrates.

3. The liquid crystal display as claimed in claim 2, wherein said electroconductive film is formed on the outside surface of the second substrate and a polarizing plate is provided on the electroconductive film.

4. The liquid crystal display as claimed in claim 2, wherein a polarizing plate is provided on the outside surface of the second substrate and said electroconductive film is formed on the polarizing plate.

5. The liquid crystal display as claimed in claim 2, wherein a polarizing plate is provided on the outside surface of the first substrate and said electroconductive film is formed on the polarizing plate.

6. The liquid crystal display as claimed in claim 1, wherein one or both of said first and second substrates is transparent.

7. The liquid crystal display as claimed in claim 1, wherein said first substrate is an active matrix substrate.

8. The liquid crystal display as claimed in claim 1, wherein an electroconductive film is provided on the outside surfaces of each of the first and second substrates.

9. The liquid crystal display as claimed in claim 1, further comprising an alignment layer disposed on the inside surfaces of each of the first and second substrates.

10. The liquid crystal display as claimed in claim 1, wherein the electroconductive film comprises a polythiophene compound having repeating units represented by the following formula (1):

(1)

11. The liquid crystal display as claimed in claim 1, wherein the electroconductive film comprises a triacetyl-(2-hydroxyethyl)ammonium salt.

12. The liquid crystal display as claimed in claim 1, wherein the electroconductive film comprises poly (alkylammonium tetraalcoxybolan).

13. A liquid crystal display comprising:
a first substrate having an outside surface and an inside surface, a second substrate having an outside surface and an inside surface facing the inside surface of the active matrix substrate, a liquid crystal composition sandwiched between the active matrix substrate and the second substrate, and a polarizing plate provided on the outside surface of one or both of the first and second substrates,
the inside surface of the first substrate having disposed thereon intersecting gate and drain electrodes, switching elements at the intersections between the gate and drain electrodes, a source electrode connected to the switching element and a common electrode at least part of which faces the source electrode, to thereby provide an electric field having a direction transverse to the first and second substrates when a voltage is developed between the source electrode and the common electrode, and
an organic electroconductive film formed on the outside surface of one or both of the first and second substrates, or on a polarizing plate.

14. A method of producing a liquid crystal display which comprises:
(1) providing a first substrate having an outside surface and an inside surface, a second substrate having an outside surface and an inside surface facing the inside surface of the first substrate, and a liquid crystal composition sandwiched between the first and second substrates, the inside surface of the first substrate having disposed thereon at least first and second electrodes to thereby provide an electric field having a direction transverse to the first and second substrates and which controls the polarizing activity of the liquid crystal when a voltage is developed between said first and second electrodes, and
(2) providing an electroconductive film which is constituted by organic materials on the outside surface of one or both of the first and second substrates.

15. The method of producing a liquid crystal display as claimed in claim 14, which further comprises providing a polaraizing plate on the outside surface of one or both of said first and second substrates.

16. The method of producing a liquid crystal display as claimed in claim 15, which comprises forming said electroconductive film on the outside surface of the second substrate and providing a polarizing plate on the electroconductive film.

17. The method of producing a liquid crystal display as claimed in claim 15, which comprises providing a polarizing plate on the outside surface of the second substrate and forming said electroconductive film on the polarizing plate.

18. The method of producing a liquid crystal display as claimed in claim 15, which comprises providing a polarizing plate on the outside surface of the first substrate and forming said electroconductive film on the polarizing plate.

19. The method of producing a liquid crystal display as claimed in claim 15, which comprises providing an electroconductive film on the outside surfaces of each of the first and second substrates.

20. The method of producing a liquid crystal display as claimed in claim 14, which further comprises providing an alignment layer on the inside surfaces of each of the first and second substrates.

21. The method of producing a liquid crystal display as claimed in claim 14, wherein said electroconductive film is polymerized by the use of a polymerizing agent.

22. The method of producing a liquid crystal display as claimed in claim 14, wherein said electroconductive film is polymerized by electrochemical means.

23. A method of producing a liquid crystal display which comprises:
(1) providing an active matrix substrate having an outside surface, an inside surface and a periphery, said inside surface having disposed thereon intersecting gate and drain electrodes, switching elements at the intersections between the gate and drain electrodes, a source electrode connected to the switching element and a common electrode at least part of which faces the source electrode, to thereby provide an electric field having a direction transverse to the active matrix substrate when a voltage is developed between the source electrode and the common electrode,
(2) providing a second substrate having an outside surface, an inside surface and a periphery,
(3) providing a polarizing plate on the outside surface of one or both of said first and second substrates,
(4) providing an alignment layer on the inside surfaces of each of the active matrix substrate and the second substrate,
(5) forming an organic electroconductive film on the outside surface of one or both of the first and second substrates, or on a polarizing plate,
(6) positioning the active matrix substrate parallel to the second substrate, providing a spacer between the two substrates to form a gap therebetween such that the inside surfaces of the active matrix substrate and the second substrate face each other, and providing a seal around the periphery of the active matrix substrate and the paired substrate to form a cell, and
(7) injecting a liquid crystal composition into the cell.

24. The method of producing a liquid crystal display as claimed in claim 23, further comprising the step of:
(8) connecting a driving circuit to the cell.

25. A liquid crystal display device comprising:

a first substrate having first and second main surfaces;

first and second electrodes formed on said first main surface of said first substrate in parallel to each other;

a second substrate having third and fourth main surfaces;

a liquid crystal layer sandwiched between said first main surface of said first substrate and said third main surface of said second substrate, light transmitting through said liquid crystal layer being controlled by an electric field supplied between said first and second electrodes; and an electroconductive organic layer formed over at least one of said second main surface of said first substrate and said fourth surface of said second substrate.

26. The device as claimed in claim 25, wherein said organic layer is formed on said second main surface of said first substrate.

27. The device as claimed in claim 25, wherein said organic layer is formed on said fourth main surface of said second substrate.

28. The device as claimed in claim 25, wherein said organic layer is formed on both of said main surface of said substrate and said fourth main surface if said second substrate.

* * * * *